United States Patent
Tateno et al.

(10) Patent No.: US 12,261,488 B2
(45) Date of Patent: Mar. 25, 2025

(54) STATOR OF ROTATING ELECTRICAL MACHINE AND ROTATING ELECTRICAL MACHINE

(71) Applicant: Hitachi Astemo, Ltd., Hitachinaka (JP)

(72) Inventors: Keisuke Tateno, Ibaraki (JP); Yuichiro Baba, Ibaraki (JP); Yuki Konishi, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 212 days.

(21) Appl. No.: 17/915,363

(22) PCT Filed: Jan. 29, 2021

(86) PCT No.: PCT/JP2021/003169
§ 371 (c)(1),
(2) Date: Sep. 28, 2022

(87) PCT Pub. No.: WO2021/205718
PCT Pub. Date: Oct. 14, 2021

(65) Prior Publication Data
US 2023/0142308 A1 May 11, 2023

(30) Foreign Application Priority Data
Apr. 7, 2020 (JP) .................. 2020-069335

(51) Int. Cl.
*H02K 11/25* (2016.01)
(52) U.S. Cl.
CPC .................. *H02K 11/25* (2016.01)

(58) Field of Classification Search
CPC .......... H02K 11/21; H02K 11/25; H02K 3/50; H02K 3/04; H02K 1/278; H02K 15/02; H02K 3/522; H02K 1/146; H02K 5/04; H02P 29/64
See application file for complete search history.

(56) References Cited

U.S. PATENT DOCUMENTS

| 11,451,120 B2* | 9/2022 | Koga ................. H02K 3/34 |
| 11,892,358 B2* | 2/2024 | Yoshihara .............. G01K 1/143 |
| 2015/0155760 A1 | 6/2015 | Bessho et al. |

(Continued)

FOREIGN PATENT DOCUMENTS

| JP | S52-002101 | 1/1977 |
| JP | 2012-217303 A | 11/2012 |

(Continued)

OTHER PUBLICATIONS

English Translation of the International Search Report issued in corresponding International Application No. PCT/JP2021/003169, dated Apr. 20, 2021.

*Primary Examiner* — Leda T Pham
(74) *Attorney, Agent, or Firm* — Foley & Lardner LLP

(57) ABSTRACT

Adhesion between a temperature detection unit and a segment coil is improved to improve temperature following capability. A stator core, a stator winding wire configured with a plurality of connected segment coils attached to the stator core, and a temperature detection unit that is in contact with the segment coil to detect temperature are provided, and among the segment coils, a segment coil at which the temperature detection unit is disposed is disposed to protrude further than other segment coils disposed alongside.

5 Claims, 4 Drawing Sheets

(56) References Cited

U.S. PATENT DOCUMENTS

| | | | |
|---|---|---|---|
| 2015/0295477 A1 | 10/2015 | Koizumi et al. | |
| 2018/0337580 A1* | 11/2018 | Baba | H02K 5/04 |
| 2019/0363615 A1 | 11/2019 | Yokoi et al. | |

FOREIGN PATENT DOCUMENTS

| | | |
|---|---|---|
| JP | 2014-090546 A | 5/2014 |
| JP | 2015-106955 A | 6/2015 |
| JP | 2019-047661 A | 3/2019 |
| JP | 2019-205260 A | 11/2019 |
| WO | WO-2017/090363 A1 | 6/2017 |

* cited by examiner

STATOR OF ROTATING ELECTRICAL MACHINE AND ROTATING ELECTRICAL MACHINE

TECHNICAL FIELD

The present invention relates to a stator of a rotating electrical machine, and a rotating electrical machine.

BACKGROUND ART

In order to manage the temperature of a motor, the temperature of a coil is managed because the coil is where a current flows in start-up and is most likely to reach high temperature. For example, PTL 1 (JP 2014-90546 A) discloses a rotating electrical machine including a rotor provided on a rotating shaft which is rotatably supported, and a stator disposed on an outer periphery of the rotor with a minute gap therebetween, the stator including a stator core having a plurality of slots formed and arranged along a circumferential direction, a stator winding wire to which a plurality of segment conductors that are inserted in the slots of the stator core are connected, and a thermistor that measures a temperature of the stator winding wire. The stator winding wire includes a slot portion accommodated in the slot, and a connecting portion that couples ends of the slot portions. The disclosed rotating electrical machine includes a temperature measuring element portion of the thermistor accommodated in a minute gap between the connecting portions of the segment conductor of the stator coil end (for example, see PTL 1).

CITATION LIST

Patent Literature

PTL 1: JP 2014-90546 A

SUMMARY OF INVENTION

Technical Problem

When measuring temperature at a neutral point including three neutral wires of a stator using a temperature sensor disposed on a V-phase stator winding wire which is the middle one among the three wires, temperature management is important in a state where electric currents flow only in coils of two phases other than the coil of which temperature is managed. The V-phase winding wire in the middle is sandwiched between the other U-phase winding wire and W-phase winding wire, and has a high following capability for temperature change since there is heat transfer between the winding wires, whereas each of the U-phase winding wire and the W-phase winding wire adjoins nothing on one side, and thus has a lower temperature than the v-phase winding wire in the middle. Thus, it is appropriate to manage temperature using the V-phase winding wire in the middle.

However, when dimensional differences in cross sections of the stator winding wires at the neutral point or a variation in positioning for a connecting work makes it difficult to reliably make the stator winding wire and the temperature sensor contact each other, a gap may be created between the temperature sensor and the stator winding wire, and make the contact between the temperature sensor and the stator winding wire unstable. To improve the temperature following capability of the temperature sensor, it is necessary that the temperature sensor reliably contacts a surface of a target to be measured.

An object of the present invention is to improve adhesion between a thermistor and a coil to improve temperature following capability of the thermistor.

Solution to Problem

A representative example of the invention disclosed in the present application is as follows. That is, a stator core, a stator winding wire configured with a plurality of connected segment coils attached to the stator core, and a temperature detection unit that is in contact with the segment coil to detect temperature are provided, and among the segment coils, a segment coil at which the temperature detection unit is disposed is disposed to protrude further than other segment coils disposed alongside.

Advantageous Effects of Invention

According to the present invention, adhesion between a temperature detection unit and a segment coil can be improved to improve temperature following capability. Problems, configurations, and effects other than those described above will be clarified by the following description of exemplary embodiments.

DESCRIPTION OF EMBODIMENTS

Figure 1:
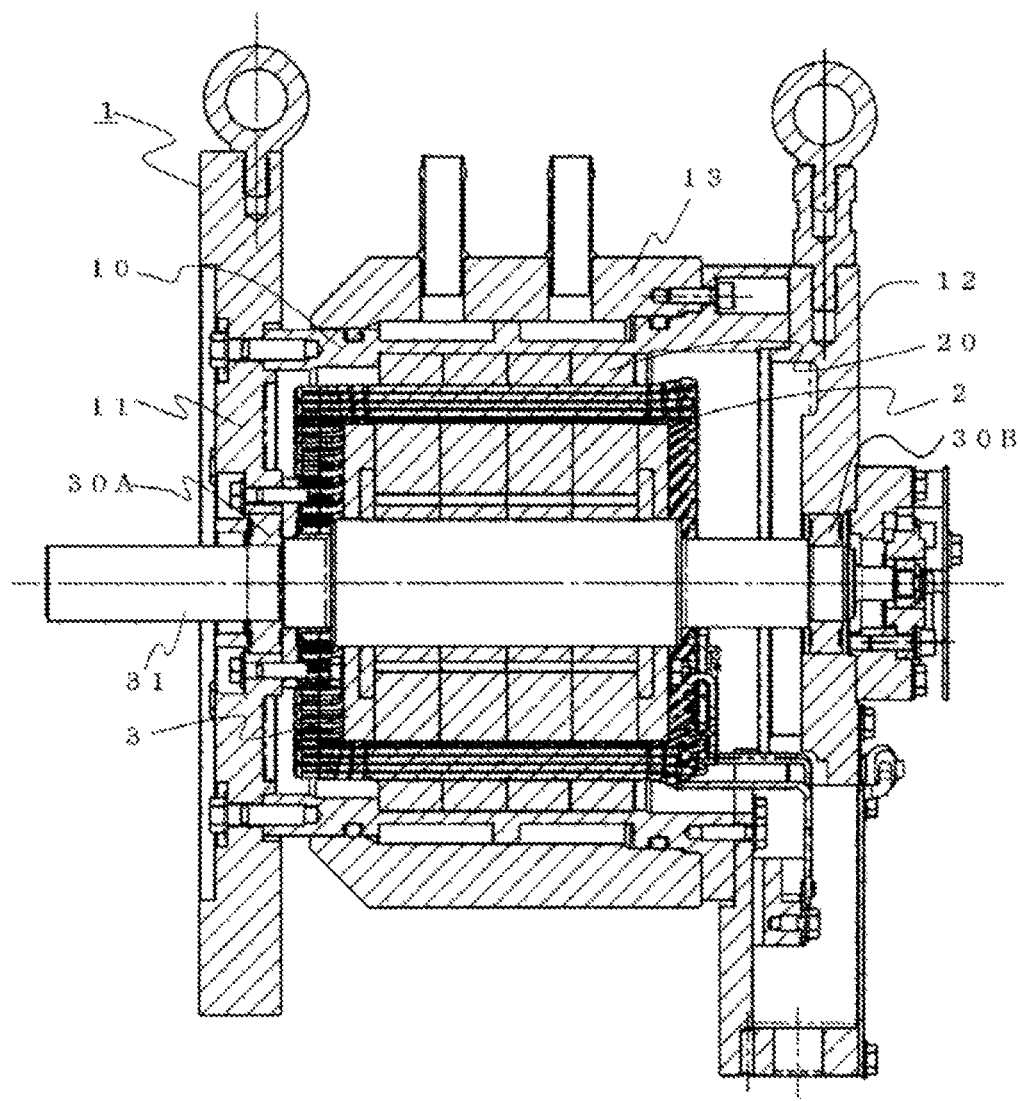
FIG. 1 is a schematic view illustrating an overall configuration of a rotating electrical machine according to an exemplary embodiment of the present invention.

FIG. 1 is a schematic view illustrating an overall configuration of a rotating electrical machine 1 according to an exemplary embodiment of the present invention. In FIG. 1, a cross section is taken for a portion of the rotating electrical machine 1 to illustrate an inside of the rotating electrical machine 1.

As illustrated in FIG. 1, the rotating electrical machine 1 includes a housing 10, a stator 2 including a stator core (stator iron core) 20 fixed to the housing 10, and a rotor 3 rotatably disposed in the stator. A casing of the rotating electrical machine 1 includes a front bracket 11, the housing 10, and a rear bracket 12. The housing 10 forms a water passage for cooling water of the rotating electrical machine 1 together with the water jacket 13.

The rotor 3 is fixed to a shaft 31 supported by a bearing 30A of the front bracket 11 and a bearing 30B of the rear bracket 12, and is rotatably held inside the stator core 20.

Figure 2:
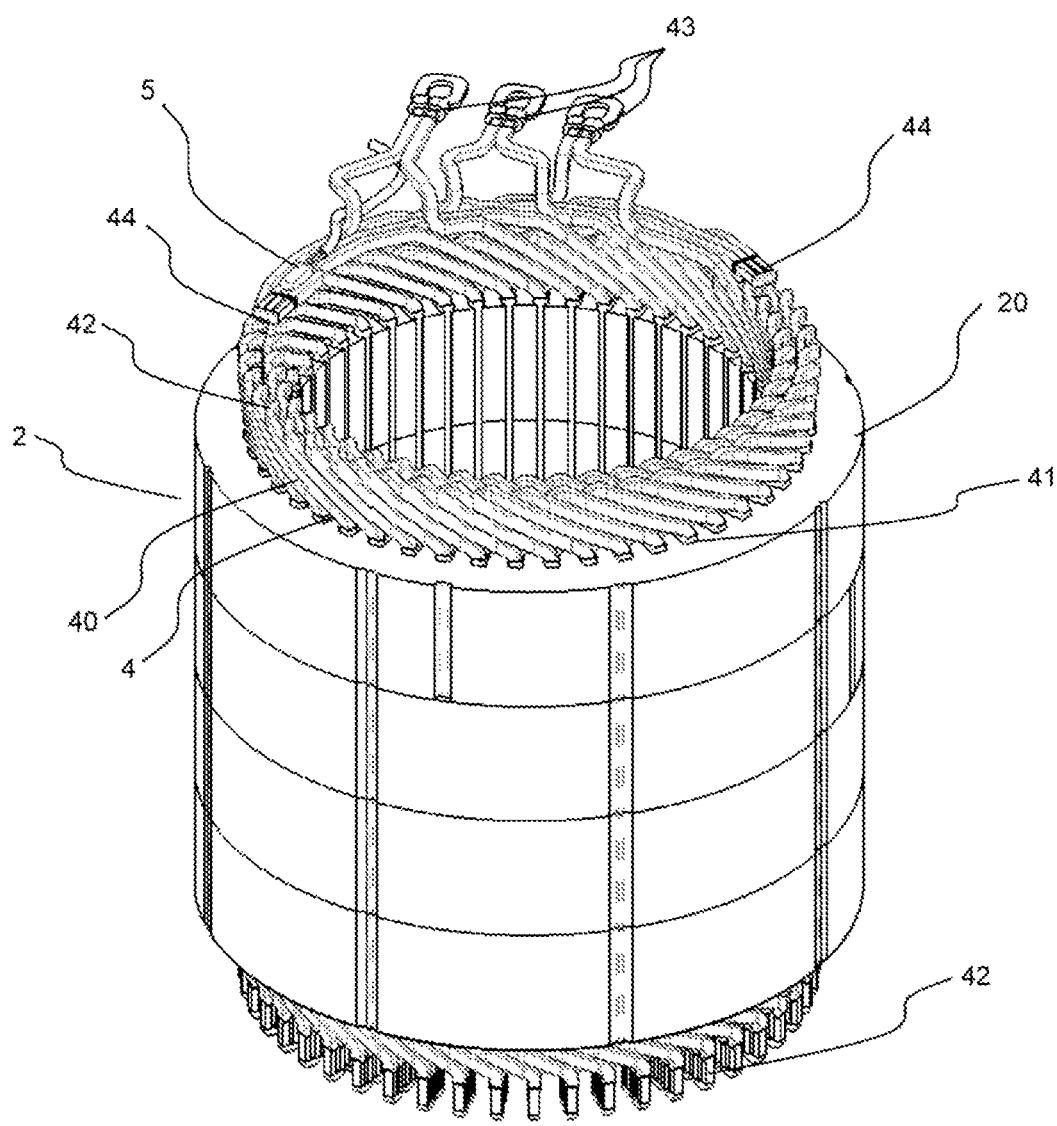
FIG. 2 is a perspective view illustrating a stator of the rotating electrical machine of the present exemplary embodiment.

FIG. 2 is a perspective view illustrating the stator 2 of the rotating electrical machine 1 of the present exemplary embodiment.

The stator 2 includes the stator core 20 having a plurality of slots formed along the circumferential direction, a stator winding wire 4, and a temperature detection element 5 that measures the temperature of the stator winding wire 4.

The stator core 20 is formed into an annular shape by stacking magnetic steel plates having a predetermined thickness along the axial direction. A plurality of slots extending in the axial direction is formed in the inner circumference of the stator core 20 along the circumferential direction.

The stator winding wire 4, or the stator coil, is attached in the slots of the stator core 20 via an insulator 41 having a form of a sheet made of an insulating resin material. The stator winding wire 4 is made by inserting, along the axial direction, segment coils which are copper rectangular conductors 40 each having a form of a substantially U-shape in the slots of the stator core 20, bending open ends of the rectangular conductors 40, and electrically connecting the bent portions of the rectangular conductors 40 by welding or the like.

The welded portions of the rectangular conductors 40 are coated with an insulating resin material. By making the stator winding wire 4 with the rectangular conductors 40 in this manner, a larger gap can be made between wires of the stator winding wire 4 at coil ends 42 at both ends of the stator core 20 compared to a single continuous round wire conductor that is wound multiple times. Note that, in the rotating electrical machine 1 of the present exemplary embodiment, the stator winding wire 4 may be formed with a round wire conductor.

The stator winding wire 4 illustrated in FIG. 2 is a winding wire of three-phase with a Y-connection, and includes a U-phase stator winding wire, a V-phase stator winding wire, and a W-phase stator winding wire formed of the rectangular conductors 40. One end of the stator winding wire 4 of each of the phases, that is, the U-phase, the V-phase, and the W-phase is disposed as an output terminal 43, and other ends of the respective stator winding wires 4 of the U-phase, the V-phase, and the W-phase are connected to form a neutral point 44, whereby a three-phase AC circuit is formed.

Figure 3:
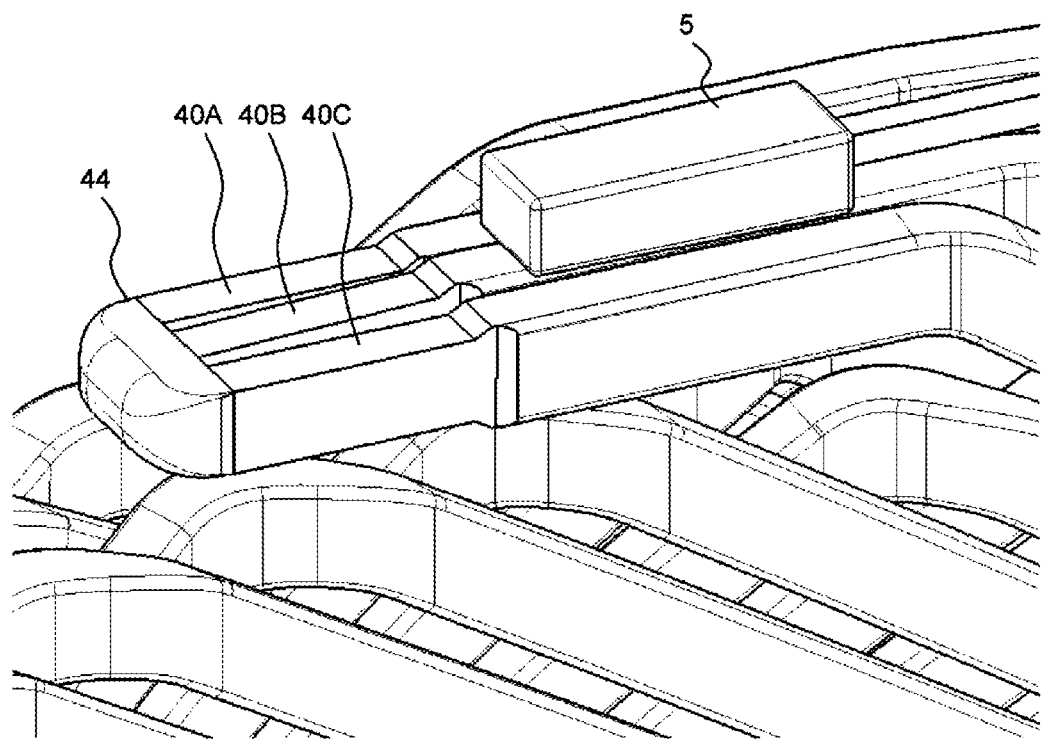
FIG. 3 is a perspective view illustrating a structure of a neutral point of a stator winding wire according to the present exemplary embodiment.
Figure 4:
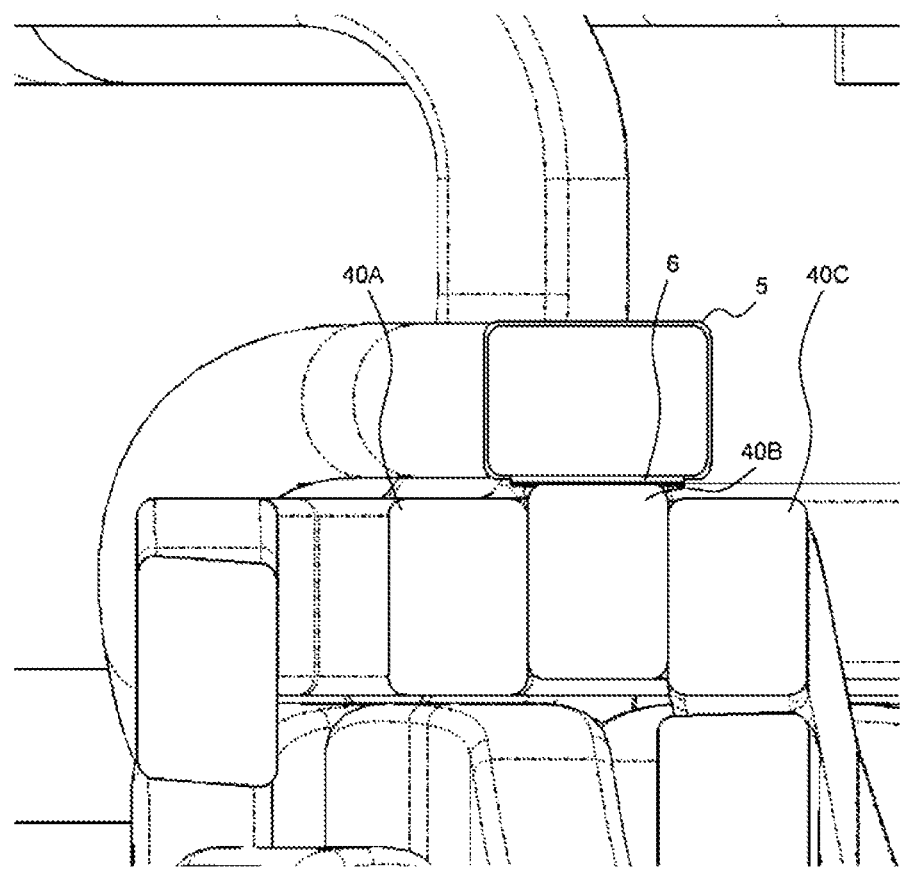
FIG. 4 is a view of the neutral point of the present exemplary embodiment as viewed along an extending direction of a stator winding wire.
Figure 5:
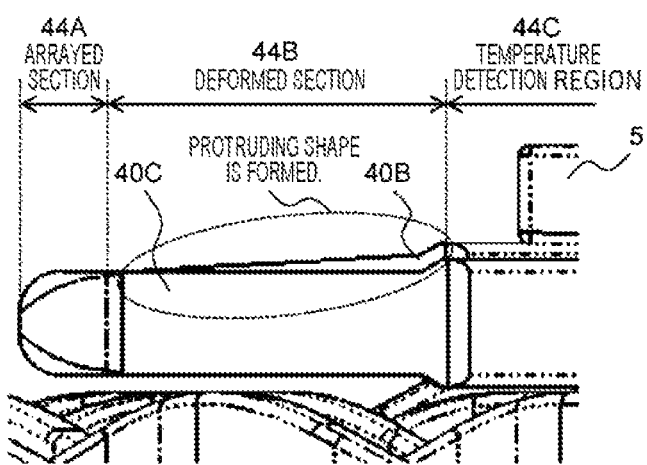
FIG. 5 is a view of the neutral point of the present exemplary embodiment as viewed along a radial direction.

FIG. 3 is a perspective view illustrating a structure of the neutral point 44 of the stator winding wire 4 of the present exemplary embodiment, FIG. 4 is a view of the neutral point 44 as viewed along an extending direction of the stator winding wire 4, and FIG. 5 is a view of the neutral point 44 as viewed along a radial direction.

A temperature detection element 5 for measuring the temperature of the stator winding wire 4 is fixed to the neutral point 44 of the stator winding wire 4. The temperature detection element 5 is a temperature sensor including a semiconductor whose electric resistance value changes along with a change in temperature. A control unit (for example, an inverter) of the rotating electrical machine 1 monitors the resistance value of the temperature detection element 5 to detect the temperature of the stator winding wire 4. When the detected temperature of the stator winding wire 4 exceeds a predetermined upper limit value, the control unit limits or stops the performance of the rotating electrical machine 1 to prevent abnormal overheating of the stator winding wire 4.

By heat transfer of the temperature of the stator winding wire 4 to the temperature detection element 5, the temperature of the temperature detection element 5 changes and the electric resistance value of the temperature detection element 5 changes. When heat conduction from the stator winding wire 4 to the temperature detection element 5 is low, a time delay occurs in the temperature change of the temperature detection element 5, that is, the change in the resistance of the temperature detection element 5 with respect to the temperature change of the stator winding wire 4.

As described above, when a time delay occurs in the temperature change of the temperature detection element 5 with respect to the temperature change of the stator winding wire 4, the stator winding wire 4 may be overheated. To prevent such overheating of the stator winding wire 4, such measures is necessary as setting a specified value of the temperature of the stator winding wire 4, which limits the performance of the rotating electrical machine 1, to be smaller by a value corresponding to the time delay. However, taking such a measures, the rotating electrical machine 1 cannot sufficiently exhibit its performance. To let the rotating electrical machine 1 sufficiently exhibit its performance, the temperature following capability of the temperature detection element 5 to follow the temperature of the stator winding wire 4 needs to be enhanced.

To solve this problem, in the rotating electrical machine 1 of the present exemplary embodiment, a single segment coil 40B connected at the neutral point 44 is disposed to be displaced in a direction away from the stator core 20 and to protrude further than other segment coils 40A and 40C, and the temperature detection element 5 is disposed so as to contact the protruding segment coil 40B.

For example, when the segment coil 40B in the middle is disposed to be recessed from the segment coils 40A and 40C that are at ends, a gap may be created between the temperature detection element 5 placed at the neutral point 44 and the segment coil 40B in the middle, and in such a case, the stator winding wire 4 and the temperature detection element 5 are not stably in contact with each other, which lowers the temperature following capability. In the present exemplary embodiment, by disposing the temperature detection element 5 so as to contact a side surface of the segment coil 40B that is protruding, the temperature detection element 5 can be brought into close contact with the segment coil 40B to enhance the temperature following capability of the temperature detection element 5.

In particular, among the segment coils 40A, 40B, and 40C connected at the neutral point 44, it is preferable that the segment coil 40B in the middle protrudes further than the other segment coils 40A and 40C. The segment coils 40A and 40C at the ends easily dissipate heat to the outside, and thus tend to have a lower temperature. When the segment coils 40A and 40C at the ends are protrudingly disposed and the temperature detection element 5 is provided on the segment coils 40A and 40C, the measured temperature will be of the segment coils 40A and 40C at the ends and having a lower temperature than the temperature of the segment coil 40B in the middle, so that the temperature of a high-temperature portion of the neutral point 44 cannot be measured. Accordingly, in the present exemplary embodiment, the temperature of the segment coil 40B, which is a portion that becomes high-temperature in the neutral point 44, can be managed, and the rotating electrical machine 1 can be appropriately controlled to extend the life of the rotating electrical machine 1.

As illustrated in FIG. 4, an adhesive layer 6 is preferably provided between the temperature detection element 5 and the segment coil 40B. It is preferable that the adhesive layer 6 is an acrylic adhesive, and has a double-sided tape-like structure. A tape constituting the adhesive layer 6 may preferably have a size that is, in a width direction, the same as the segment coil 40B or smaller than the temperature detection element 5 but larger than the segment coil 40B and, in a longitudinal direction, equal to or slightly smaller (for example, about 1.0 mm) than the temperature detection element 5. The adhesive layer 6 avoids including an air layer having poor thermal conduction between the temperature detection element 5 and the segment coil 40B and enhances the temperature following capability of the temperature detection element 5.

As illustrated in FIG. 5, distal ends of the segment coils 40A, 40B, and 40C at the neutral point 44 are welded, the segment coils 40A, 40B, and 40C are arrayed for welding at the arrayed section 44A, and the segment coil 40B in the middle has a plastically deformed portion in a deformed section 44B in the rear of the arrayed section 44A, the plastically deformed portion forming a protruding shape toward a temperature detection region 44C where the temperature detection element 5 is disposed. As described above, since the segment coil 40B in the middle is plastically deformed in the deformed section 44B between the arrayed section 44A and the temperature detection region 44C so as to form protruding, at which the temperature detection element 5 is disposed, in the temperature detection region 44C, a protruding portion at which the temperature detection element 5 is disposed can be formed without performing welding in a state where the segment coils 40A, 40B, and 40C are disposed with a displacement therebetween, without reducing a cross sectional area for welding, and with the welding strength maintained.

As described above, according to the exemplary embodiment of the present invention, the stator core 20, the stator winding wire 4 configured with a plurality of connected segment coils attached to the stator core 20, and the temperature detection unit (temperature detection element 5) that contacts the segment coils 40B to detect temperature are provided, and the segment coil 40B at which the temperature detection unit 5 is disposed is disposed so as to protrude further than the other segment coils 40A and 40C disposed alongside, so that the segment coil 40B in the middle is not recessed from the other segment coils 40A and 40C even if there are dimensional differences in cross sections of the segment coils or a variation in positioning for a connecting work, and this makes the temperature detection unit 5 to stably contact the segment coil 40B and improves temperature following capability, which enables appropriate management of the temperature of the motor.

In addition, at least the three segment coils 40A, 40B, and 40C are disposed alongside, and the second segment coil 40B disposed between the first segment coil 40A and the third segment coil 40C protrudes further than the first segment coil 40A and the third segment coil 40C. That is, since the segment coil 40B disposed in the middle is connected so as to protrude high, the segment coil 40B of which temperature becomes high is brought into stable contact with the temperature detection unit 5, and thus the temperature of the rotating electrical machine 1 can be accurately measured.

In addition, the first segment coil 40A, the second segment coil 40B, and the third segment coil 40C, which allow currents of different three phases (U, V, and W) flow, are connected at the neutral point 44, the second segment coil 40B among the three segment coils 40A, 40B, and 40C constituting the neutral point 44 is disposed to be further displaced in a direction perpendicular to the extending direction than the first segment coil 40A and the third segment coil 40C, and the temperature detection unit 5 is disposed at a side surface of the second segment coil 40B, so that even when only the U-phase segment coil 40A and the W-phase segment coil 40C at the ends have no current flowing therein and the segment coil 40B in the middle has a current flowing therein, the temperature of the rotating electrical machine 1 can be accurately measured to appropriately control the rotating electrical machine 1, and the life of the rotating electrical machine 1 can be extended.

In addition, the adhesive layer 6 is provided between the temperature detection unit 5 and the segment coil 40B, and the adhesive layer 6 is formed to have the same size as the segment coil 40B or a size larger than the segment coil 40B but smaller than the temperature detection unit 5 in a view along the extending direction of the segment coil 40B. That is, the problem that the position of the temperature detection unit 5 cannot be fixed by simply placing the temperature detection unit 5 on the segment coil 40B can be solved, and thus the temperature detection unit 5 can be fixed at an appropriate position. In addition, by filling the space between the segment coil 40B and the temperature detection unit 5 with the adhesive layer 6, a region occupied by air having a low thermal conductivity is reduced, and thus heat transfer from the segment coil 40B to the temperature detection unit 5 can be improved. In addition, adhesive force between the temperature detection unit 5 and the segment coil 40B can be improved by maximizing an adhesive area of the adhesive layer 6.

In addition, provided with the arrayed section 44A in which the end portions of the first segment coil 40A, the second segment coil 40B, and the third segment coil 40C are connected, the temperature detection region 44C in which the temperature detection unit 5 is disposed at a side surface of the second segment coil 40B, and the deformed section 44B which is between the arrayed section 44A and the temperature detection region 44C and in which the second segment coil 40B is deformed so as to form protruding in the temperature detection region 44C and extend in a direction different from the other segment coils 40A and 40C, a protruding portion at which the temperature detection element 5 is disposed can be formed without performing welding in a state where the segment coils 40A, 40B, and 40C are disposed with a displacement therebetween, without reducing a cross sectional area for welding, and with the welding strength maintained.

Note that the present invention is not limited to the above-described exemplary embodiments, and includes various modifications and equivalent configurations within the spirit of the appended claims. For example, the above-described exemplary embodiments have been described in detail for easy understanding of the present invention, and the present invention is not necessarily limited to those having all the described configurations. Further, a part of the configuration of an exemplary embodiment may be replaced with a configuration of a different exemplary embodiment. Further, a configuration of a different exemplary embodiment may be added to the configuration of an exemplary embodiment.

In addition, for each exemplary embodiment, a part of a configuration may be eliminated or replaced with a configuration of a different exemplary embodiment, or a configuration of a different exemplary embodiment may be added.

REFERENCE SIGNS LIST

1 rotating electrical machine
2 stator
3 rotor
4 stator winding wire
5 temperature detection element
6 adhesive layer 10 housing
11 front bracket
12 rear bracket
13 water jacket
20 stator core
30A bearing
30B bearing
31 shaft
40 rectangular conductor
40A, 40B, 40C segment coil
41 insulator
42 coil end
43 output terminal
44 neutral point
44A arrayed section
44B deformed section
44C temperature detection region

The invention claimed is:

1. A stator of a rotating electrical machine, comprising:
a stator core;
a stator winding wire configured with a plurality of segment coils attached to the stator core, wherein the plurality of segment coils comprises at least a first segment coil, a second segment coil, and a third segment coil disposed alongside, with distal ends of the first to third segment coils coupled to each other, wherein the second segment coil is interposed between the first segment coil and the third segment coil; and
a temperature detection unit that is in contact with the second segment coil of the plurality of segment coils to detect temperature and comprises a width greater than the second segment coil, extending at least partially above the first segment coil and the third segment coil,
wherein at least a portion of the second segment coil protrudes further than the first segment coil and the third segment coil to (i) contact a first side of the second segment coil with the temperature detection unit and (ii) form gaps between the temperature detection unit and at least the first segment coil and the third segment coil, and wherein a second side and a third side of at least the portion of the second segment coil are in contact with the first segment coil and the third segment coil, respectively.

2. The stator of the rotating electrical machine according to claim 1, wherein:
currents of different phases flow respectively in the first segment coil, the second segment coil, and the third segment coil, and the first segment coil, the second segment coil, and the third segment coil are connected at a neutral point at the distal ends of the first to third segment coils, and
the second segment coil is disposed to be displaced from the first segment coil and the third segment coil in a direction perpendicular to an extending direction.

3. The stator of the rotating electrical machine according to claim 1, further comprising:
an adhesive layer provided between the temperature detection unit and the second segment coil,
wherein the adhesive layer is formed to have a size same as the second segment coil or a size larger than the second segment coil but smaller than the temperature detection unit in a view along an extending direction of the second segment coil.

4. The stator of the rotating electrical machine according to claim 2, further comprising:
an arrayed section in which end portions of the first segment coil, the second segment coil, and the third segment coil are connected;
a temperature detection region in which the temperature detection unit is disposed at the first side of the second segment coil; and
a deformed section provided between the arrayed section and the temperature detection region and in which the second segment coil is deformed so as to form a protrusion in the temperature detection region and extend in a direction different from other segment coils.

5. A rotating electrical machine comprising a stator according to claim 1.

* * * * *